(12) United States Patent
Challis

(10) Patent No.: US 8,424,798 B2
(45) Date of Patent: Apr. 23, 2013

(54) AIRCRAFT WITH HELICOPTER ROTOR, THRUST GENERATOR AND ASSYMETRIC WING CONFIGURATION

(76) Inventor: Douglas Challis, Cartier (CA)

( * ) Notice: Subject to any disclaimer, the term of this patent is extended or adjusted under 35 U.S.C. 154(b) by 383 days.

(21) Appl. No.: 12/940,459

(22) Filed: Nov. 5, 2010

(65) Prior Publication Data

US 2011/0272519 A1      Nov. 10, 2011

Related U.S. Application Data

(63) Continuation-in-part of application No. 12/091,688, filed as application No. PCT/CA2006/001762 on Oct. 27, 2006, now Pat. No. 8,336,808, which is a continuation-in-part of application No. 11/259,353, filed on Oct. 27, 2005, now abandoned, application No. 12/940,459, which is a continuation-in-part of application No. 11/491,497, filed on Jul. 24, 2006, now abandoned, which is a continuation-in-part of application No. 11/259,353, filed on Oct. 27, 2005, now abandoned.

(51) Int. Cl.
*B64C 27/22* (2006.01)
*B64C 27/06* (2006.01)
*B64C 5/02* (2006.01)
*B64C 27/82* (2006.01)

(52) U.S. Cl.
USPC ........ 244/17.19; 244/6; 244/17.11; 244/45 R; 244/87

(58) Field of Classification Search .................. 244/6, 8, 244/17.11, 17.19, 17.23, 45 R, 87
See application file for complete search history.

(56) References Cited

U.S. PATENT DOCUMENTS

| 1,117,080 | A | | 11/1914 | Oman |
| 1,777,678 | A | | 1/1927 | Rieseler et al. |
| 1,975,124 | A | | 8/1930 | Rieseler et al. |
| 2,531,976 | A | * | 11/1950 | Garrett ............................. 244/6 |
| 2,575,886 | A | * | 11/1951 | Myers .............................. 244/6 |
| 2,743,072 | A | | 4/1956 | Emmi |
| 3,610,555 | A | | 10/1971 | Nagler |

(Continued)

FOREIGN PATENT DOCUMENTS

JP       10181694      7/1998

OTHER PUBLICATIONS

X.Toff, Addition 2004 (-2010) to the list of Asymmetric aircraft, http://cmeunier.chez-alice.fr/Asynnm addition.htm Nov. 18, 2009 to Oct. 3, 2010.

*Primary Examiner* — Joseph W Sanderson
(74) *Attorney, Agent, or Firm* — Kyle R. Satterthwaite; Ryan W. Dupuis; Ade & Company Inc.

(57) ABSTRACT

An aircraft features a source of forward thrust on a fuselage having a helicopter rotor assembly and an asymmetric primary wing configuration providing more wing-generated lift on one side of the fuselage than the other. The primary wing configuration counteracts the rotor's dissymmetry of lift during forward cruising, and reliance on the separate thrust source for such cruising reduces demand on the main rotor, keeping the angle of attack on the rotor blades low to avoid the stalling and violent vibration experienced by conventional helicopters at relatively high speeds. In some embodiments, an oppositely asymmetric tail wing or horizontal stabilizer acts alone, or together with an offset vertical stabilizer laterally outward from the tail, to counteract yaw-inducing drag of the primary wing.

12 Claims, 12 Drawing Sheets

U.S. PATENT DOCUMENTS

| | | | |
|---|---|---|---|
| 3,693,910 A * | 9/1972 | Aldi | 244/7 A |
| 3,884,431 A * | 5/1975 | Burrell | 244/7 A |
| 3,921,938 A | 11/1975 | Jupe et al. | |
| 4,765,567 A * | 8/1988 | Gutman et al. | 244/8 |
| 5,190,242 A | 3/1993 | Nichols | |
| 5,240,205 A | 8/1993 | Allongue | |
| 5,437,419 A | 8/1995 | Schmitz | |
| 5,738,301 A * | 4/1998 | Francois et al. | 244/17.19 |
| 6,089,501 A | 7/2000 | Frost | |
| 6,830,214 B2 | 12/2004 | Carson | |
| 8,336,808 B2 * | 12/2012 | Challis | 244/17.19 |
| 2005/0151001 A1 * | 7/2005 | Loper | 244/6 |
| 2008/0237393 A1 | 10/2008 | Challis | |
| 2011/0272519 A1 * | 11/2011 | Challis | 244/6 |

* cited by examiner

_US 8,424,798 B2_

AIRCRAFT WITH HELICOPTER ROTOR, THRUST GENERATOR AND ASSYMETRIC WING CONFIGURATION

CROSS-REFERENCE TO RELATED APPLICATIONS

This application is a continuation-in-part of U.S. application Ser. No. 11/491,497, filed Jul. 24, 2006, and a continuation-in-part of U.S. application Ser. No. 12/091,688, the former of which which is a continuation-in-part of U.S. application Ser. No. 11/259,353, filed Oct. 27, 2005 and the latter of which is both the National Stage of International Application No. PCT/CA2006/001762, filed Oct. 27, 2006, and a continuation-in-part of both U.S. application Ser. No. 11/259,353, filed Oct. 27, 2005, and U.S. application Ser. No. 11/491,497, filed Jul. 24, 2006.

FIELD OF INVENTION

The present invention relates to a rotor aircraft and more particularly to such an aircraft employing cooperation of a helicopter rotor, thrust generator and asymmetric wing configuration to achieve greater cruising speed that conventional helicopters.

BACKGROUND

Conventional helicopters, while offering drastically improved maneuverability over airplanes, are limited to travelling at relatively low speeds. During vertical motion or hovering, the helicopter is oriented horizontally such that the main rotor is driven for rotation about a generally vertical axis to create lift. To achieve forward motion, extra power is applied, collective pitch is increased and the helicopter is tilted nose down out of the horizontal orientation by adjusting the cyclic pitch to increase the angle of attack of the rotor blades during a portion of their rotation in which they extend rearward from the hub, thereby create more lift near the rear of the aircraft. With the aircraft in this tilted position, the rotor acts to create both lift and forward thrust.

During forward flight, the effective air speed of a blade as it advances in its rotation is the sum of the forward speed of the helicopter and the blades rotational speed, as the motion of the blade relative to the helicopter is in a forward direction. The effective air speed of a retreating blade however, is the difference between the rotational speed and the forward speed of the helicopter, as they are in opposite directions. Since lift varies with the square of velocity, the advancing blade will thus produce more lift than the retreating blade. This dissymmetry of lift can be counteracted by flapping and cyclic feathering of the blades, which increase and decrease the angles of attack of the retreating and advancing blades respectively during forward flight to create a balance of lift between the two sides. Increasing the angle of attack too much will cause a blade to stall, as smooth laminar airflow over the surfaces of the blade is lost. As the critical angle of attack is approached, the blades undergo violent vibrations known as buffeting. As a result, conventional helicopters are limited in their maximum speed as increasing the forward velocity leads to a need for increased angle of attack for retreating blades, and a high angle of attack will lead to stalling and a corresponding lack of lift.

Compound helicopters have been developed to try and overcome the speed limitations of conventional helicopters. These compound aircraft combine features of the helicopter with those of an airplane in an attempt to provide the maneuverability of the former and the speed of the latter. U.S. Pat. Nos. 2,531,976 and 2,575,886 by Garrett and Myers respectively and U.S. Patent Application Publication Number 2005/0151001 by Loper describe compound helicopters that have wings and nose mounted propellers that provide lift and thrust respectively for forward flight at speeds that could not be achieved using their main rotors.

Garrett teaches a main rotor assembly that is folded down into a fuselage of the aircraft during forward flight.

Myers teaches a main rotor that is stopped in a position parallel to the line of flight when approaching the stalling speed so as not to create drag during forward flight provided by the propeller and wings.

Loper teaches a main rotor that is unloaded to autogyrate during cruising flight so that the majority of lift is provided by the wings.

The presence of large wings on opposite sides of these aircraft may decrease the efficiency of using the main rotor to create lift during vertical movement, hovering and the transition from hovering to forward flight as their surface area creates vertical drag. A full wing span across two sides of the aircraft also increases the weight of the aircraft and the cost of its manufacture due to more material and assembly requirements. The wings of a compound helicopter do not automatically eliminate all rotor related issues in forward flight. For example, in compound helicopters with the rotor arranged to free-wheel in forward cruising, the weight and drag created by the free-wheeling rotor still have to be dealt with.

As a result, there is room for further development and improvement in the field of high speed rotor type aircraft.

SUMMARY OF THE INVENTION

According to one aspect of the invention there is provided an aircraft comprising:

a fuselage having a front end and a longitudinal axis;

a main helicopter rotor supported for rotation about an axis thereof on top of the fuselage, said rotor being operable to control both vertical and horizontal movement of the aircraft;

a powerplant supported on the fuselage and operatively connected to the main helicopter rotor for driven rotation thereof in a direction causing blades of the main helicopter rotor retreat rearwardly away from the front end of the fuselage on a first side of the fuselage;

a thrust generator supported on the fuselage and operable to selectively product thrust to move the aircraft forward;

a primary wing configuration supported on the fuselage and projecting laterally outward relative thereto to counter dissymmetry of lift of the main helicopter rotor during forward flight by producing more wing-generated lift on the first side of the fuselage than on a second side thereopposite.

The present invention provides a source of thrust on a fuselage having a typical helicopter rotor assembly that can be adjusted by the pilot to provide vertical lift and horizontal thrust in forward, rearward and transverse directions. By reducing the dependency on the main rotor for forward thrust, the propeller allows greater forward speeds as the angle of attack on the rotor's blades can be kept low to avoid the stalling and violent vibration experienced by conventional helicopters at relatively high speeds. By reducing the maximum angle of attack experienced by the main rotor during its rotation in forward cruising from that of a conventional helicopter but still using the main rotor to generate lift, the addition of a full wing span extending from both sides of the fuselage can be avoided, and replaced with an asymmetric wing configuration providing lift on the retreating-blade side of the fuselage to overcome the rotor's dissymmetry of lift and thus cooperate with the rotor to produce enough lift for the overall aircraft.

Preferably the primary wing configuration projects laterally outward relative to the fuselage on only the first side thereof.

Preferably there is provided a tail assembly that comprises a tail boom extending rearward from the fuselage and a tail structure extending laterally from the tail boom at a distance rearward from the fuselage, the tail structure being configured to produce more drag on one side of the tail boom than another, the one side of the tail boom on which more drag is provided by the tail structure being opposite the first side of the fuselage.

Preferably the tail structure comprises a secondary wing configuration supported on the fuselage at a position rearward from the primary wing configuration and rearward from the axis of the main helicopter rotor to provide lift of a tail boom extending rearward from the fuselage during forward flight, the secondary wing configuration being arranged to provide more lift to one side of the tail boom than another, the one side of the tail boom on which more lift is provided by the secondary wing configuration being opposite the first side of the fuselage.

Preferably the secondary wing configuration projects further laterally to one side of the tail boom than another, the one side of the tail boom to which the secondary wing configuration projects further being opposite the first side of the fuselage.

There may be a vertical stabilizer supported on the tail boom at a distance laterally outward therefrom on a side thereof opposite the first side of the fuselage. In this instance, preferably the vertical stabilizer is supported on the secondary wing at a distance laterally outward from the tail boom on the side thereof on which more lift is provided by the secondary wing configuration.

Alternatively, the vertical stabilizer may be supported on the tail boom in an orientation angled out of alignment with the longitudinal axis to, during forward flight, exert a transverse force on the tail from a side thereof opposite the first side of the fuselage.

Preferably the thrust generator comprises a propeller arranged for driven rotation about a propeller axis at the front end of the fuselage. In such instance, preferably the main helicopter rotor and the propeller are arranged to rotate in a same one of clockwise or counterclockwise directions as viewed from above and behind respectively.

According to another aspect of the invention, there is provided a method of flying an aircraft comprising a fuselage, a main helicopter rotor supported for rotation on top of the fuselage, and a thrust generator supported on the fuselage and operable to selectively product thrust to move the aircraft forward, the method comprising:

transitioning from hover or other in-flight manoeuvre to forward flight;

powering the thrust generator to provide forward thrust of the aircraft in forward flight;

providing lift during the forward flight through a combination of continued powering of the main helicopter rotor and simultaneous relative movement of air past a wing configuration that projects laterally from the fuselage in a manner producing more wing-generated lift on a side of the fuselage where blades of the rotor retreat rearwardly away from a front end of the fuselage than on an opposing side of the fuselage; and continuing to power the main helicopter rotor regardless of aircraft velocity during the forward flight.

According to yet another aspect of the present invention there is provided an aircraft comprising:

a fuselage having a front end and a longitudinal axis;

a main helicopter rotor supported for rotation about an axis thereof on top of the fuselage, said rotor being operable to control both vertical and horizontal movement of the aircraft;

a propeller supported for rotation about an axis thereof at the front end of the fuselage for selectively producing thrust to move the aircraft forward; and at least one powerplant supported on the fuselage;

the main rotor and propeller each being operatively connected to the at least one powerplant for selective driven rotation thereby;

wherein on at least one side of the fuselage, vertical lift is provided substantially wholly by the main helicopter rotor during forward flight.

The at least one powerplant may comprise a propeller powerplant and a rotor powerplant, the propeller and main helicopter rotor being operatively connected to the propeller and rotor powerplants respectively. Alternatively, the at least one powerplant may comprise a common powerplant having a rotor output and a propeller output, the propeller and main helicopter rotor being operatively connected to the propeller and rotor outputs respectively.

The propeller may be adjustable in pitch. Alternatively, there may be provided a clutch operable to couple and decouple the propeller and the at least one powerplant. Minimizing the propeller pitch or disengaging the clutch during hover prevents interference with operation of the main rotor by the propeller to allow stable hover.

Preferably the main helicopter rotor, at a forwardmost point of its rotation, and the propeller, at an uppermost point in its rotation, move in a common direction. In other words, the main helicopter rotor and propeller, as viewed from above the aircraft and the rear end of the aircraft respectively, rotate in a same one of clockwise and counter-clockwise directions. In this instance, preferably the propeller is supported for rotation in a plane generally perpendicular to a rotational plane of the main helicopter rotor.

Alternatively, the main helicopter rotor, at a forwardmost point of its rotation, and the propeller, at an uppermost point in its rotation, move in opposite directions. In other words, the main helicopter rotor and propeller, as viewed from above the aircraft and the rear end of the aircraft respectively, rotate in opposite ones of clockwise and counter-clockwise directions. In this instance, preferably the propeller is supported for rotation in a plane transverse to the fuselage and inclined with respect to the longitudinal axis of the fuselage. This plane may extend upward from front to rear with said longitudinal axis horizontally oriented or downward from front to rear with said longitudinal axis horizontally oriented.

There may be provided a horizontal stabilizer disposed rearward of the fuselage and extending obliquely with respect to the longitudinal axis of the fuselage so as to extend downward from front to rear. The horizontal stabilizer may be supported rearward of a tail rotor supported for rotation rearward of the fuselage. The downward angling of the horizontal stabilizer creates lift at the tail, thereby acting to counteract a tendency for the aircraft to pitch nose-up with the propeller powered to create forward thrust during forward flight.

Vertical lift on both sides of the fuselage may be provided substantially wholly by the main helicopter rotor during forward cruising.

Alternatively, there may be provided a wing extending laterally from one side of the fuselage to counter dissymmetry of lift of the main helicopter rotor during forward flight. By providing lift on a side of the aircraft opposite the advancing blade, the wing reduces reliance on increasing the angle of attack of the retreating blade to counter dissymmetry of lift of the main rotor. This aids in keeping the main rotor's angle of attack low to allow faster forward speed without retreating blade stall.

According to a further aspect of the invention there is provided a method of flying an aircraft comprising a fuselage having front and rear ends and a longitudinal axis, a main helicopter rotor supported for rotation about an axis thereof on top of the fuselage, said rotor being operable to control both vertical and horizontal movement of the aircraft, and a propeller supported for rotation about an axis thereof at the front end of the fuselage operable to selectively produce thrust to move the aircraft forward, the method comprising:

transitioning from hover or other in-flight manoeuvre to forward flight;

providing half of an amount of vertical lift needed to maintain an altitude of the aircraft during forward flight on a first side of the fuselage substantially wholly by powering the main helicopter rotor;

providing a remaining half of the amount of vertical lift needed to maintain the altitude of the aircraft during forward flight on a second side of the fuselage opposite the first side; and powering the propeller to provide forward thrust of the aircraft in forward flight.

Transitioning to forward flight may comprise adding forward cyclic to create forward thrust from the main helicopter rotor, increasing power to the propeller as the aircraft beings moving forward and removing the forward cyclic.

Transitioning to forward flight may further comprise the addition of rearward cyclic to pitch the front end of the fuselage upward.

Powering the main helicopter rotor may provide the remaining half of the amount of vertical lift needed to maintain the altitude of the aircraft during forward flight on the opposite side of the fuselage.

Alternatively, flowing air around a wing extending laterally from the fuselage on the second side thereof, and powering the main helicopter rotor, together may provide substantially wholly the remaining half of the amount of vertical lift needed to maintain the altitude of the aircraft during forward flight.

The method may further comprise providing additional forward thrust of the aircraft by powering of the main helicopter rotor, the additional forward thrust complementing the forward thrust of the aircraft provided by the propeller.

BRIEF DESCRIPTION OF THE DRAWINGS

In the accompanying drawings, which illustrate a exemplary embodiments of the present invention.

DETAILED DESCRIPTION

Figure 1:
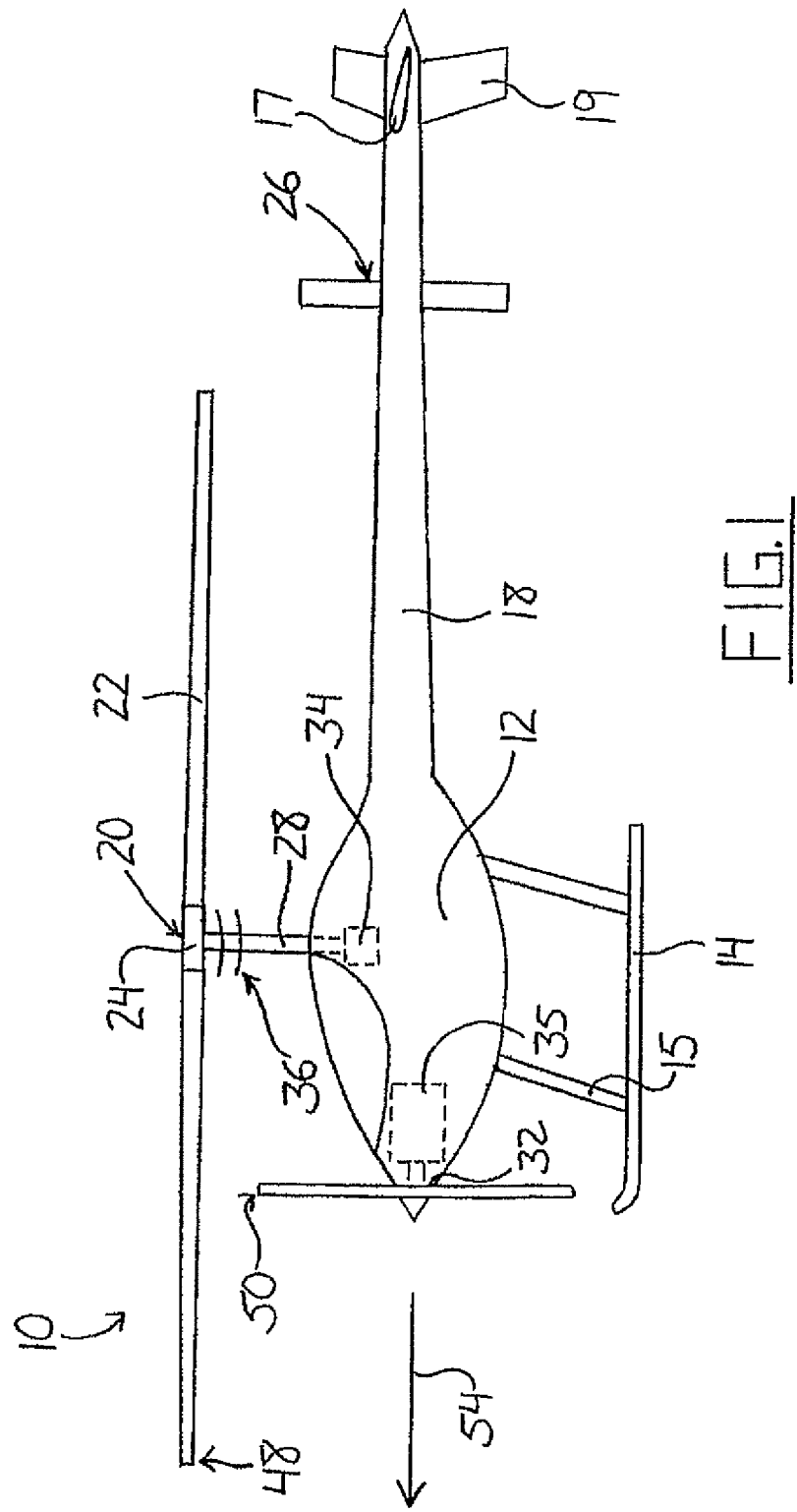
FIG. 1 is a side elevational view of an aircraft according to a first embodiment of the present invention.

As shown in the figures, the aircraft of the illustrated embodiments have many features in common with the conventional helicopter. The aircraft 10 has a fuselage 12 supported by a landing gear when grounded, for example supported atop a pair of skids 14 by braces 15 as shown in FIG. 1, with a tail boom 18 extending rearward from the fuselage 12. Suitable landing gear other than skids are known to those of skill in the art may be substituted for those illustrated and described. A main rotor assembly 20 consisting of blades 22 extending radially outward from a hub 24 is supported above the fuselage 12. A tail rotor 26 is supported near an end of the tail 18 opposite the fuselage 12. A horizontal stabilizer 17 and a vertical stabilizer 19 are supported on the tail boom 18 for stability during flight. These components are all similar in function to those found on a conventional helicopter. The main rotor assembly 20 is controlled by a pilot to provide uniform lift for vertical movement or unbalanced lift to tip the aircraft and induce lateral movement. The tail rotor 26 is driven for rotation to provide transverse thrust to create a moment about the rotor's shaft 28 to oppose a tendency for the fuselage to rotate about the shaft due to the driven rotation of the main rotor assembly 20.

The aircraft 10 of the illustrated embodiments differ from the conventional helicopter in that there is provided a propeller 30 on the nose, or front end, 32 of the fuselage 12. The tractor propeller 30 is driven for rotation in order to produce forward thrust for the aircraft. While operated in the same manner as a conventional helicopter during vertical, sideways and rearward movement, the improvements of the present invention are most apparent during forward flight, in which operation of the propeller 30 reduces the reliance on the main rotor 20.

As in conventional helicopters, the rotor assembly is supported atop the shaft 28 that is operatively coupled to a powerplant 34 mounted within the fuselage for driven rotation. A typical swashplate assembly 36, known to those of skill in the art, provided on the shaft 28 allows cyclic and collective pitch control of the rotor blades 22. The collective pitch control allows the pilot to simultaneously change the pitch of all the blades 22 in order to increase or decrease the angle of attack of the blades to achieve the desired amount of thrust. The cyclic pitch control allows the pilot to change the pitch of the blades 22 depending on their position during rotation, thereby controlling the direction in which the thrust is applied. In conventional helicopters, creating a difference in the angle of attack from one side of the hub 24 to an opposite side by means of the cyclic pitch control creates uneven lift across the rotor assembly 20 which causes the aircraft 10 to tilt and move toward the lowered side having less lift. The same procedure is followed when operating the aircraft 10 of the present invention to achieve motion, except that when forward movement, specifically, is desired, power can be provided to the propeller 30 to provide forward thrust. This reduces the need for forward thrust from the main rotor 20, and may provide enough thrust to eliminate the need for thrust from the main rotor entirely such that the aircraft 10 does not have to be tilted forward like a conventional helicopter during forward motion. It should be appreciated however, that from a hovering state, the aircraft 10 may be transitioned to forward cruising in the same manner as a conventional helicopter, that is, without using the propeller for forward thrust.

In a conventional helicopter the cyclic control is used to create more lift during a rear half of the main rotor's rotation nearest the tail than in a front half of the main rotor's rotation nearest the nose, thereby causing the helicopter to tilt nose down such that the rotation plane of the main rotor is angled from a horizontal orientation. This cyclical action is combined with an increase in power and collective pitch to the rotor so that the angling of the rotor acts to continue producing lift while adding a forward thrust component. When flying forward with the present invention, the angle of attack of the retreating blades does not have to be as high, due to the fact that the propeller is providing thrust for forward cruising. The required collective and cyclic pitches of the blades 22 are therefore less than required for forward flight in a conventional helicopter, as less overall thrust is needed from the main rotor 20 and it can be adjusted to only create lift. This decrease in the required angle of attack of the blades 22 leads to faster possible forward motion without reaching the critical angle of attack at which buffeting occurs and beyond which stalling may take place.

Figure 9:
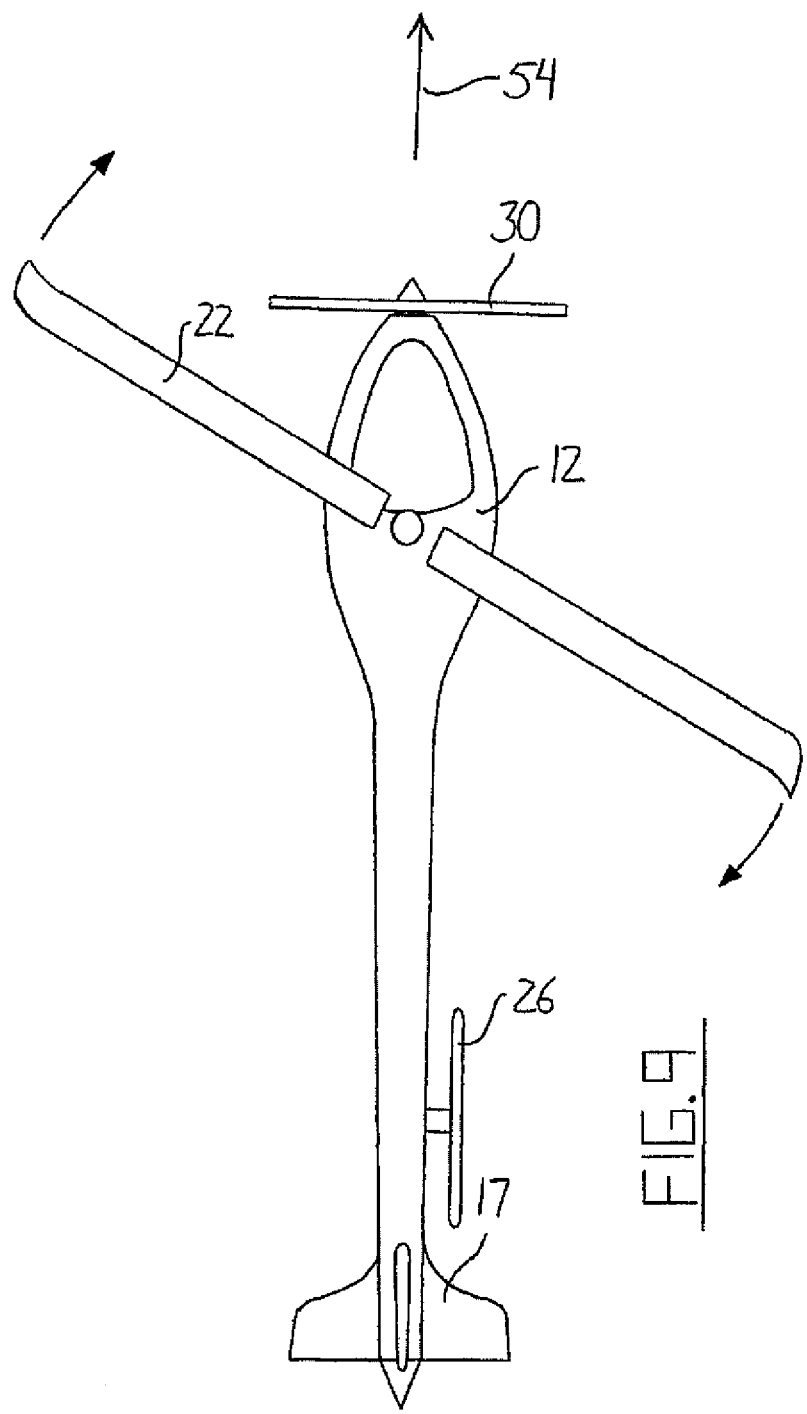
FIG. 9 is an overhead plan view of the aircraft of FIG. 1.
Figure 10:
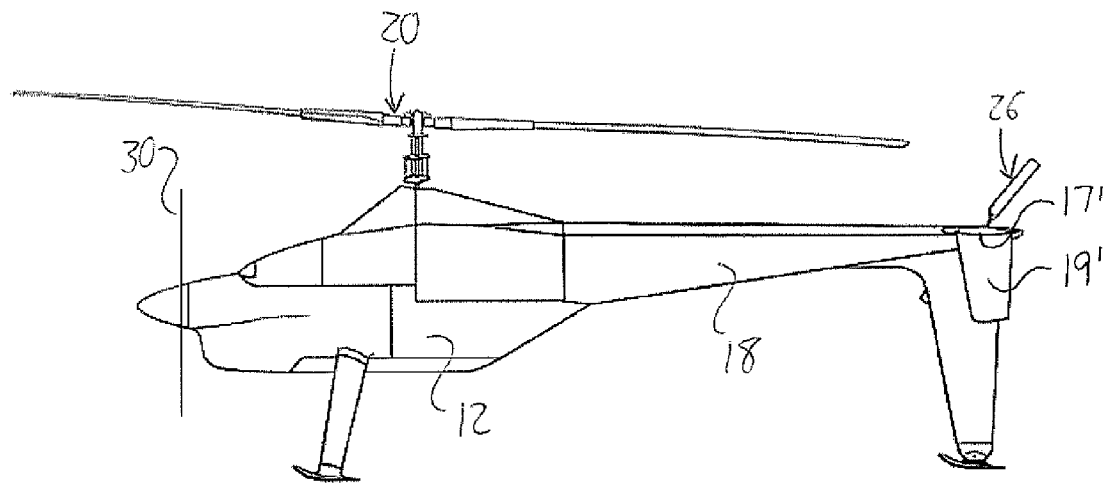
FIG. 10 is a left side elevational view of an aircraft according to a fifth embodiment of the present invention.
Figure 11:
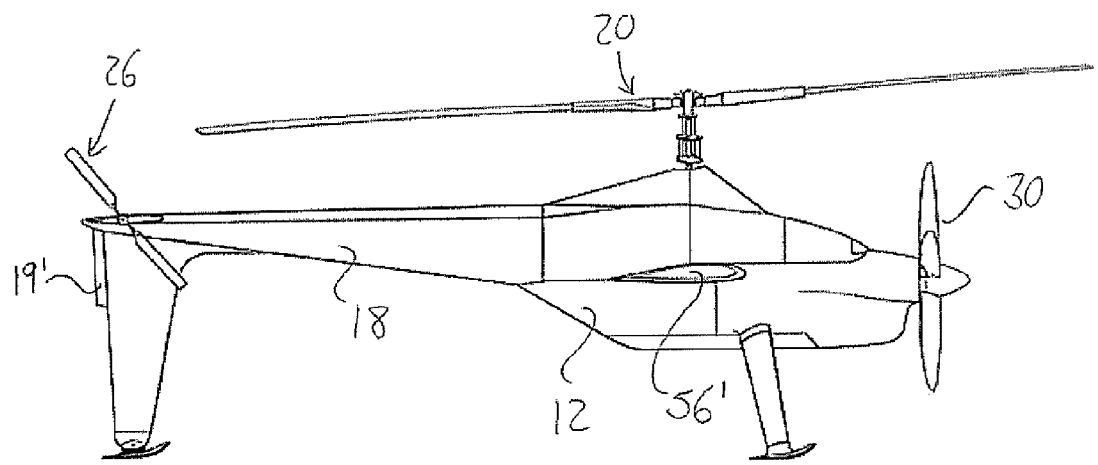
FIG. 11 is a right side elevational view of the aircraft of FIG. 10.

As in a conventional helicopter, the driven rotation of the main rotor 20 causes a reactive torque to be exerted on the fuselage 12 in a direction opposite that of the rotor's motion. The tail rotor 26 near the end 38 of the tail 18 is driven for rotation in order to create thrust transverse to the length of the aircraft 10. This thrust creates a moment which tends to rotate the fuselage 12 about the shaft 28 of the main rotor assembly 20 in a direction opposite the reaction torque created by the rotation thereof. The magnitude of the thrust and resulting moment can be controlled by adjusting the pitch of the tail rotor 26. The energy exerted to drive the tail rotor 26 is generally considered to be wasteful, as it does not contribute to the airspeed of the aircraft 10, but rather is only used to prevent relative motion of its components. The vertical stabilizers of conventional helicopters located on the tail near the tail rotor are sometimes angled with respect to a longitudinal axis of the aircraft. During forward flight, this angled arrangement creates a force transverse to the longitudinal axis which opposes the reaction torque of the main rotor to reduce reliance on the tail rotor. Moving forward at higher speeds, this transverse force may be strong enough to counteract all of this spin inducing torque. It should be appreciated that the vertical stabilizer 19 of the present invention may be supported in an angled orientation to reduce reliance on the tail rotor 26. As understood by those of skill in the art, it should be appreciated that the side of the tail on which the tail rotor is supported for rotation is determined by the rotational direction of the main rotor and resulting reaction torque exerted on the fuselage. This fact is illustrated by the difference in the overhead views of two different embodiments shown in FIGS. 3 and 9. From above, the embodiment of FIG. 3 has its main rotor rotating counter-clockwise and the tail rotor supported on the left side of the aircraft, while the embodiment of FIG. 9 has its main rotor rotating clockwise and the tail rotor supported on the right side of the aircraft. Alternate systems for countering the reaction torque of the main rotor, NOTAR and counter rotating rotor systems for example, are known to those of skill in the art and may be applied to the present invention.

As shown in FIG. 1, a first embodiment of the present invention features the propeller supported for rotation within a plane generally perpendicular to the plane of rotation of the main rotor. The aircraft may be flown such that the main rotor 20 rotates about a vertical axis, thereby providing only vertical lift. This differs from a conventional helicopter wherein the cyclic control is used to create more lift during a rear half of the main rotor's rotation nearest the tail than in a front half of the main rotor's rotation nearest the nose, thereby causing the helicopter to tilt nose down such that the rotation plane of the main rotor is angled from a horizontal orientation and its rotation axis is correspondingly angled from a vertical orientation. This cyclical action is combined with an increase in power and collective to the rotor. These actions angle and increase the force produced by the main rotor from a vertical direction such that both vertical lift and forward thrust components are created to establish forward cruising of the helicopter. With the main rotor of the aircraft of FIG. 1 being rotated about a vertical axis to create only lift, the propeller is left to provide all of the forward thrust allowing forward flight. The main rotor thus only needs to be provided with the minimum power and collective pitch needed to provide sufficient lift to maintain the altitude of the aircraft during forward flight. With a minimum amount of collective pitch so applied and no need to apply additional cyclic pitch to create forward thrust, the angle of attack of the main rotor is kept relatively low allowing higher forward speeds to be achieved without experiencing retreating blade stall.

In this first embodiment, there exists a predetermined relationship between the rotational directions of the main rotor and the propeller. Specifically, the main rotor blades 22, at the fowardmost point 48 of their rotation, and the blades of the propeller 30, at the uppermost point 50 of their rotation, move in the same direction. In other words, the main rotor and propeller, as viewed from above and behind respectively, both rotate in the same one of either clockwise or counter-clockwise directions. Test flights with a radio-controlled prototype of this embodiment demonstrated tendencies for the tail to oscillate up and down during forward cruising and the nose to pitch upward when power is provided to the propeller. To counteract these tendencies, the horizontal stabilizer 17 was increased in size and moved rearward from its original position, which can be seen in the embodiments of FIGS. 3 to 5. The resulting position of the horizontal stabilizer 17 rearward of the tail rotor 26, as shown in FIG. 1, led to the elimination of tail oscillation in forward flight, but alone did not counter the nose-up tendency of the aircraft. The propeller 30 is provided with a clutch to prevent the nose from lifting during hovering, vertical takeoff or landing and other manoeuvres where forward thrust is not desired. The clutch allows the propeller to be decoupled from its drive source 35 such that no power is delivered to the propeller until forward thrust is needed. Alternatively, a variable pitch propeller may be used to allow the pitch to be reduced to zero to reduce the effects of the propeller's rotation until forward thrust is needed. However, the nose-up problem again becomes an issue once the propeller pitch is increased or the clutch is engaged to create forward thrust. As illustrated, this tendency for nose lifting during forward motion was overcome by angling the horizontal stabilizer 17 downward, from front to back, from a plane parallel to the rotational plane of the main rotor 20 and the axis of the tail 18. This creates an angle of attack at the horizontal stabilizer that produces lift at the tail during forward flight which acts to counteract the tendency for the nose to lift under driven rotation of the propeller. Alternatively, the aircraft may be tilted slightly forward by the cyclic control in order to create more lift in the rear half of the main rotor's rotation to counteract this nose-up tendency, similar to the way forward thrust is created for forward flight of a conventional helicopter, except to a lesser degree. In this latter approach, less forward cyclic is applied than in forward cruising of a conventional helicopter, and so the overall top speed is still improved as the resulting pitch is not as great. However, as mentioned above, avoiding the application of cyclic pitch and simply driving the main rotor for rotation about a vertical axis in a horizontal plane with only enough collective pitch and power needed to maintain altitude keeps the main rotor angle of attack as low as possible to avoid retreating blade stall and associated problematic conditions. This is why the first embodiment corrects the nose-up tendency through providing the horizontal stabilizer with an angle of attack to create lift during forward cruising rather than through the application of forward cyclic.

Figure 6:
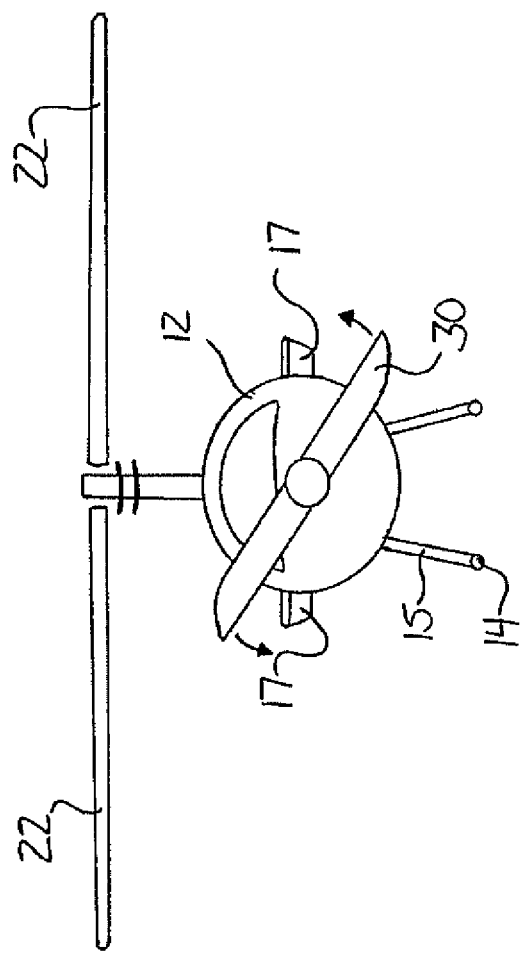
FIG. 6 is a front elevational view of the aircraft of FIG. 1.

The radio controlled prototype of the first embodiment was constructed with a 2-horsepower motor driving a clutched propeller and a 0.5-horsepower motor driving the main rotor. The propeller and main rotor turn clockwise as viewed from behind and above respectively (the rotational direction of the propeller being shown in FIG. 6 as counter-clockwise as viewed from in front of the aircraft, from which it will be appreciated that such rotation is in the opposite direction as viewed from behind). Relatively high speed cruising, with the fuselage's longitudinal axis oriented generally horizontally so that the rotor was driven about a vertical axis to generate all lift and no thrust, was found to be stable with the collective pitch at approximately 5 degrees to provide the aircraft's vertical lift to maintain altitude, which corresponded to the amount of collective pitch used to maintain a hover. Stability decreased beyond this value to the point the aircraft was highly unstable at a collective pitch of 8 degrees. For comparison, a conventional helicopter might require between 6 and 12 degrees of collective pitch during forward flight to provide enough force for lift and forward thrust, plus cyclic pitch to properly angle the rotor. It was found that angling of the propeller up to 2 degrees in either direction from a plane perpendicular to the main rotor's rotational plane had little effect on control of the aircraft. An angle of 4 degrees between the horizontal stabilizer and a plane parallel to the tail's longitudinal axis was found to effectively counteract the tendency for the nose to lift during forward flight. It should be appreciated that these values are presented as exemplary and may be varied, for example, in response to other variations in aircraft characteristics such as weight distribution.

The aircraft of the first embodiment can be transitioned from hover to forward flight in different ways due to the presence of the propeller. One option is to transition in a manner similar to that of a conventional helicopter by increasing power and forward cyclic to the main rotor in order to tilt the aircraft downward at the nose and generate forward thrust. Upon attaining a certain amount of forward speed, the aircraft experiences transitional lift associated with an increase in rotor efficiency due to the introduction of fresh air to the rotor (recirculation of air through the rotor at the blade tips reduces as the aircraft gains horizontal velocity). At this point, power to the propeller can be increased to take over the duty of providing forward thrust and so the power and collective pitch of the main rotor can be reduced and forward cyclic can be removed, thereby tilting the aircraft into a horizontal orientation for forward cruising. Alternatively, power can be gradually added to the propeller while hovering to introduce some forward thrust, and once adequate speed for transitional lift has been attained, power and collective pitch of the main rotor can be reduced. In this case, some forward cyclic may be applied to counteract upward pitching of the nose as the propeller power is increased and then taken off as lift created at the tail by the horizontal stabilizer increases with forward speed. In either case, the end result is that in forward cruising only the propeller is used to create forward thrust, thereby minimizing the power and pitch of the main rotor to allow higher top speeds.

Although described above as being flown in a generally horizontal orientation during forward cruising, with the rotor driven about a vertical axis to create only lift and no thrust, the aircraft may flown forward with a slight forward tilt similar to, but less extreme than, a conventional helicopter such that rotor does produce some forward thrust to compliment that of the propeller. This facilitates an increase in the aircraft's acceleration while still allowing operation at a lower maximum rotor blade pitch during rotation and a greater top speed than a conventional helicopter. For example, the radio-controlled prototype of the first embodiment was found to have increased acceleration and top speed when tilted forward by approximately 3 or 4 degrees from a horizontal orientation by applying some forward cyclic control and flown at full throttle with a collective pitch of approximately 9 degrees. However, this required adjustment of the prototype's controls to increase the rotor's RPM from its initial setting in which full throttle corresponded to a collective pitch of approximately 12 degrees, as attempts to achieve forward thrust from the rotor and propeller at this initial RPM setting resulted in a high degree of instability. These 9 degrees of collective pitch are greater than the approximately 5 or 6 degrees of collective pitch required for forward cruising in a horizontal orientation, but are still less than the 12 degrees of collective pitch at full throttle for forward cruising of a similar conventional helicopter not having a propeller. Once again, It should be appreciated that these values are presented as exemplary and may be varied within the scope of the present invention.

Initiating forward flight in the radio controlled aircraft of the first embodiment by increasing power to the propeller has been found to induce yaw that can be countered by increasing the power to the tail rotor. As mentioned above, power to the tail rotor can be reduced as forward speed increases if the vertical stabilizer is angled to counter the main rotor's reaction torque on the fuselage.

Figure 3:
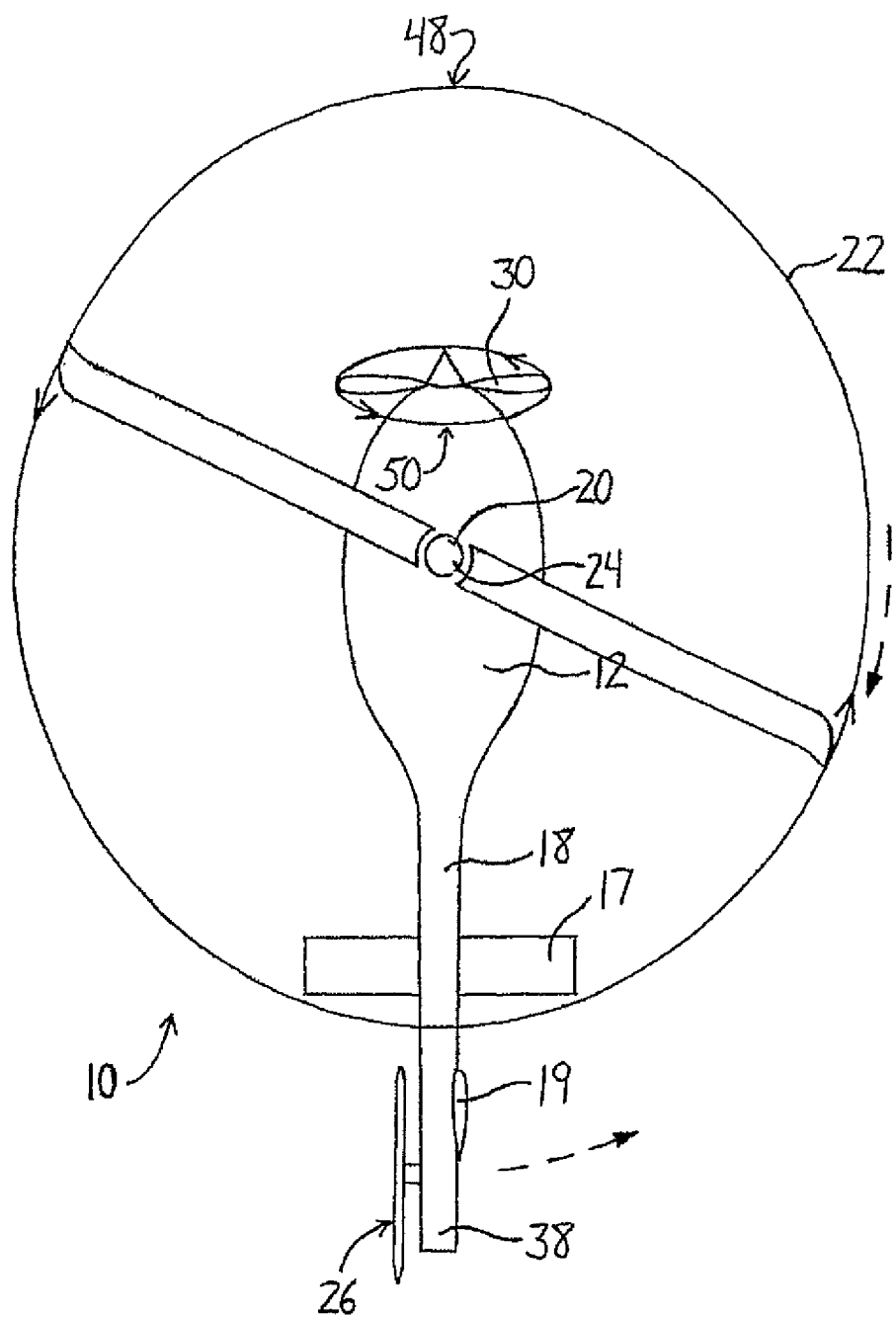
FIG. 3 is an overhead plan view of the aircraft of FIG. 2.
Figure 4:
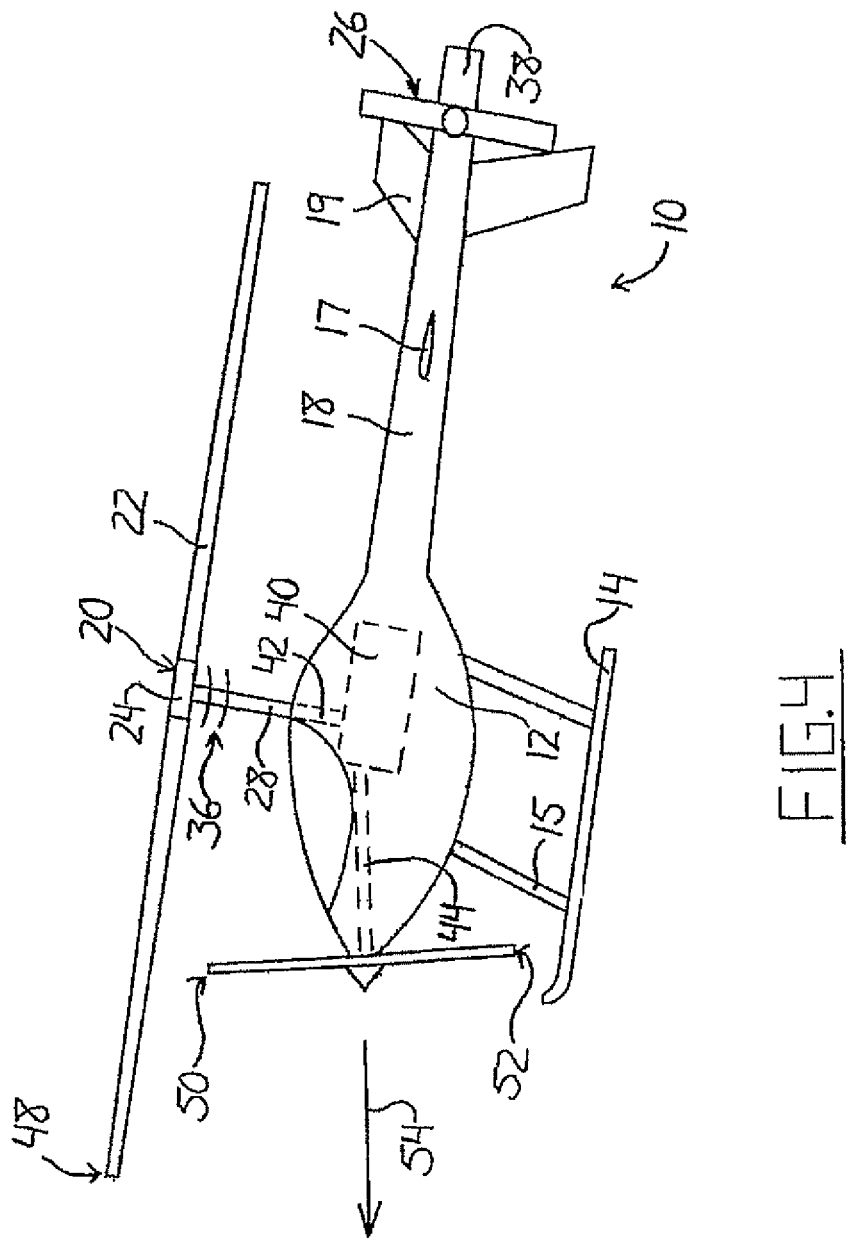
FIG. 4 is a side elevational view of an aircraft according to a third embodiment of the present invention.
Figure 5:
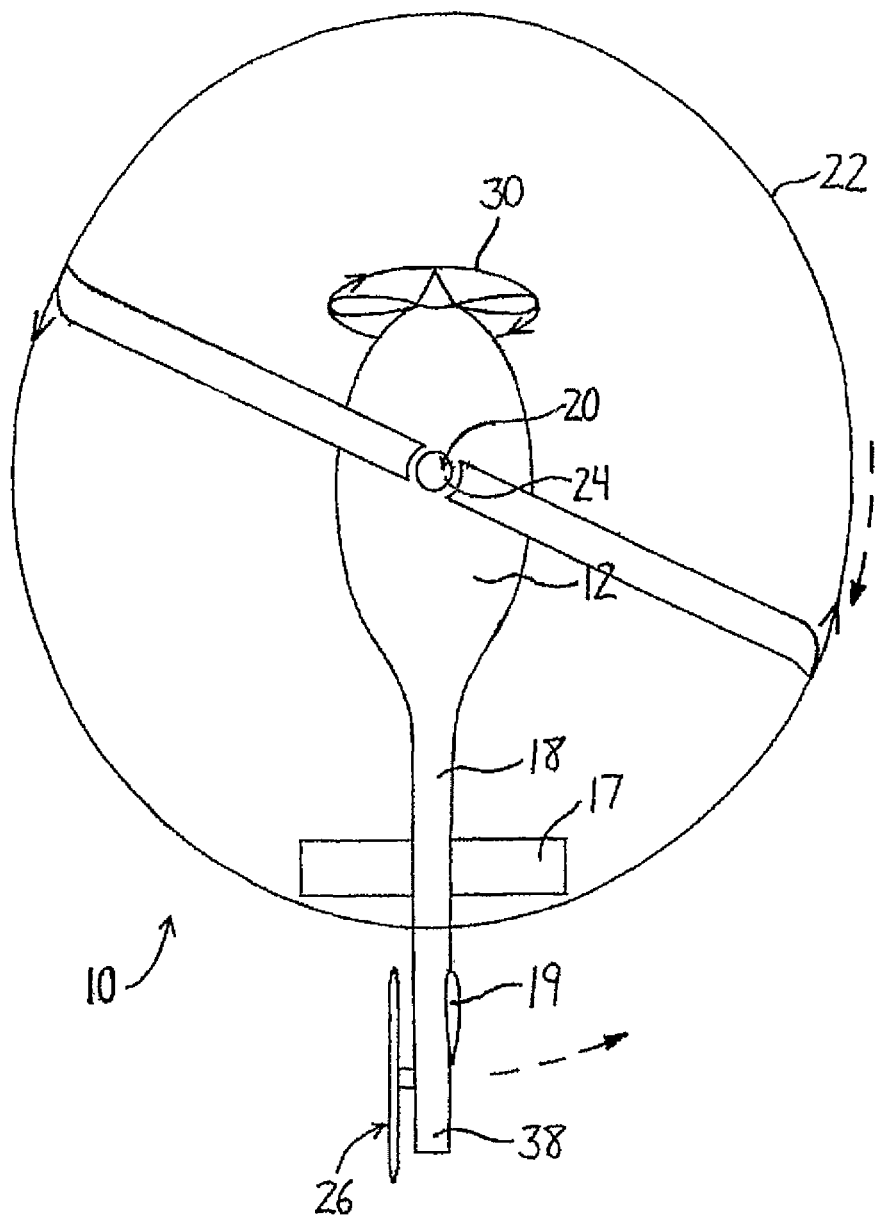
FIG. 5 is an overhead plan view of the aircraft of FIG. 4.

FIGS. 3 to 5 show second and third embodiments of the present invention in which the main rotor and propeller, as viewed from above and behind respectively, rotate in opposite ones of clockwise and counter-clockwise directions. In other words, the main rotor blades 22, at the fowardmost point 48 of their rotation, and the blades of the propeller 30, at the uppermost point 50 of their rotation, move in opposite directions. Tests with radio controlled prototypes of these embodiments found that in such arrangements, the introduction of forward thrust by the propeller to induce forward motion was found to cause the aircraft to enter a sudden nose dive. However, it was found that tilting of the propeller out of the plane perpendicular to the rotational plane of the main rotor could overcome this nose-diving tendency.

Figure 2:
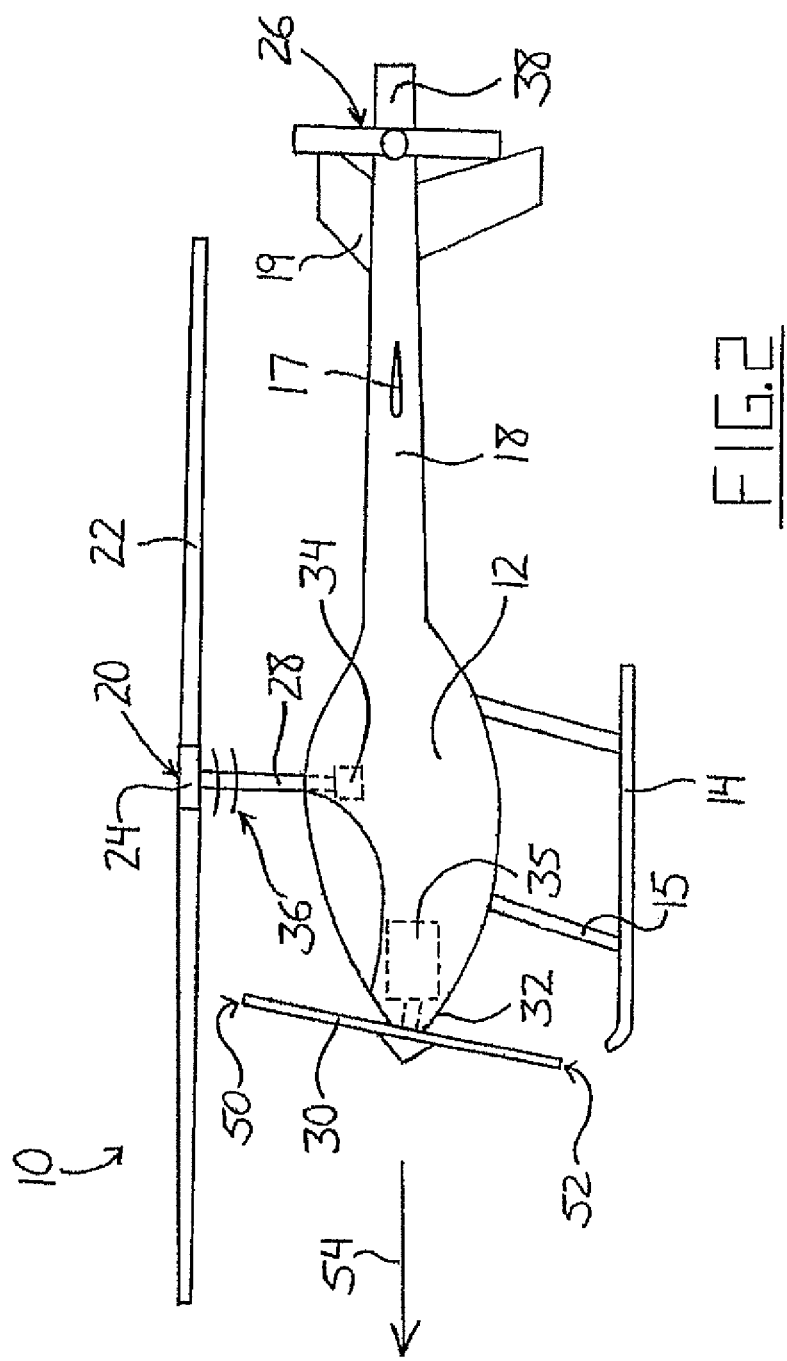
FIG. 2 is a side elevational view of an aircraft according to a second embodiment of the present invention.

As seen in FIG. 2, the propeller 30 of the second embodiment is not mounted on the nose 32 so as extend in a vertical plane parallel to the main rotor shaft 28 and normal to a longitudinal axis of the fuselage 12. The propeller 30 is tilted rearward such that a lowest point in its rotation 52 is disposed forward of the highest point in its rotation 50. In other words, the axis of the propeller 30 has been rotated downward about its front end from a longitudinal axis of the fuselage 12 in a vertical plane by a small angle.

A radio controlled prototype of the second embodiment of the present invention was able to achieve forward speeds estimated at approximately twice what was attainable before the installation of the nose mounted propeller and a respective powerplant. However, the aircraft was somewhat difficult to control in its upper velocity range. It is contemplated however that control at these higher speeds may be improved with flight experience as the differences in flight characteristics from conventional helicopters become more appreciated. This prototype was found to fly well at lower speeds with a propeller of relatively fine pitch having its rotational plane tilted back approximately twelve degrees from a vertical orientation and a rotor motor having a power rating double that of a propeller motor. It should be appreciated that the aforementioned details of this prototype have been presented in an exemplary context and that the present invention is not limited to this particular arrangement.

Test flights with the radio controlled aircraft of the second embodiment have shown that a combination of factors, such as the propeller pitch, propeller size, propeller tilt angle, propeller speed and forward air speed, seem to affect the relationship between the longitudinal axis of the fuselage and the line of forward thrust exerted on the aircraft 10. It should therefore be appreciated that by providing control over as least some of these factors, the orientation or trim of the aircraft can be controlled during forward flight without increasing the pitch on the main rotor, for example to maintain a parallel relationship between the forward thrust line 54 and the longitudinal axis of the fuselage to allow forward flight in a horizontal orientation. The propeller 30 may be of the variable pitch type to allow control of its pitch during flight. The propeller 30 may be pivotally mounted for limited motion about an axis transverse to the fuselage to allow control over the angle between the propeller's plane of rotation and the longitudinal axis of the fuselage. This would provide the ability to fine tune the tilt of the propeller 30 order to maintain a horizontal orientation of the aircraft 10 during forward flight at particular speeds. The pivotal mounting may be made controllable by the pilot to allow small adjustments during flight, or could be made to be adjustable only during grounded maintenance. The latter option would allow adjustments in the angle of tilt to be made to compensate for exchangeable mounting of propellers having different sizes or pitches without having to add another control device for the pilot in the aircraft. The propeller 30 and its respective power plant 35 may be supported on a single pivotal mount to provide this tilt control.

As seen in FIG. 4, the propeller 30 of the third embodiment is also not mounted on the nose 32 so as extend in a vertical plane parallel to the main rotor shaft 28 and normal to a longitudinal axis of the fuselage 12. However, unlike the second embodiment, here the propeller 30 is tilted forward such that the highest point in its rotation 50 is disposed forward of the lowest point in its rotation 52. In other words, the axis of the propeller 30 has been rotated upward about its front end from a longitudinal axis of the fuselage 12 in a vertical plane by a small angle. Unlike the first two embodiments there is provided a single common powerplant 40 that has separate rotor and propeller outputs 42 and 44 that are operatively connected to the main helicopter rotor and propeller respectively. A radio controlled prototype of the third embodiment of the present invention was found to be easier to control than that of the second embodiment but unable to achieve as high a top forward cruising speed as the first embodiment. The aircraft features a single motor 40 having a driveshaft 44 extending to the nose from the transmission to drive a variable pitch propeller geared to run at a relatively high speed. In this arrangement, the propeller and variable pitch main and tail rotors all run in sync off the same motor. During hover and other manoeuvres not requiring forward thrust, the propeller is kept at zero pitch so as to use a minimum amount of power. The prototype's propeller plane is angled approximately 3 or 4 degrees from a vertical plane perpendicular to the rotor plane and normal to the fuselage's longitudinal axis. It should be appreciated that the aforementioned details of this prototype have been presented in an exemplary context and that the present invention is not limited to this particular arrangement. A higher forward cruising speed relative to that attainable by conventional helicopter flying techniques before the installation of the propeller can be reached by flying the prototype in a tilted back orientation similar to, but to less degree than, a gyrocopter.

For forward horizontal cruising the nose is pitched up to tilt the aircraft, including the main rotor, back and dispose the propeller in a vertical rotational plane so as to exert forward thrust along the direction of travel. So to transfer from a hover to forward flight, the aircraft and rotor is pitched nose down by adding forward cyclic to create forward thrust from the main rotor, as is done with a conventional helicopter. Once some forward motion is induced, additional forward thrust is created by increasing the pitch of the propeller. As the thrust from the propeller takes over, the cyclic is adjusted to remove the rotor-created forward thrust and rock the aircraft back to pitch the nose slightly upward so that the propeller is rotating in a generally vertical plane. Flown in this tilted orientation, the aircraft has similar handling characteristics to a gyrocopter and thus is easy to control. Since all of the forward thrust duties are taken over by the propeller, the pitch on the main rotor is significantly less than in forward cruising of a conventional helicopter, and so the top speed is increased due to the lower angle of attack on the rotor. The control of the aircraft at higher speeds is significantly improved over that of the second embodiment, but the top speed is not as high as the first embodiment due to the tilting back of the rotor in forward cruising. The similarity of this embodiment to a gyrocopter refers only to the slight rearward tilt, or pitching up of the nose, during forward flight and the resulting handling characteristics, and it should be appreciated from the above that the main rotor is powered like that of a helicopter.

As illustrated by the above embodiments, the aircraft of the present invention may be provided with separate propeller and rotor powerplants for driving rotation of the propeller and main rotor respectively, or may be provided with a common powerplant having separate propeller and rotor outputs that are operatively connected to the main helicopter rotor and propeller respectively. Suitable powerplants for driving propellers and helicopter rotors are known to those of skill in the art and may be adapted for use with the present invention. When a tail rotor is used to counter the reaction torque of the main rotor, it may be variable in pitch and driven off the main rotor in an arrangement typically found in conventional helicopters. To avoid instability in hover due to propeller rotation, a clutched or variable pitch propeller may be used.

The first, second and third embodiments described herein above each outline an aircraft 10 that provides the manoeuvrability of a conventional helicopter with an increased attainable forward air speed, without the addition of large wings which may interfere with the lift providing capabilities of the main rotor. In forward cruising, the aircraft of each embodiment uses the propeller to create forward thrust while relying on the main rotor to provide substantially all of the vertical lift. The reduced reliance on the main rotor to create forward thrust allows reduction of the maximum angle of attack experienced during the main rotor's rotation from that of a conventional helicopter, thereby allowing higher forward cruising speeds to be attained without experiencing retreating blade stall.

Test flights of radio controlled model's has demonstrated that while rotation of the main rotor and propeller, as viewed from above and behind respectively, in the same or opposite ones of clockwise and counter-clockwise directions determines whether an aircraft will tend to nose-up or nose-down under the initial action of the propeller, the aircraft will tend to nose-up during forward cruising at higher speeds regardless of the relationship between their rotational directions. Based on this, it should be appreciated that the embodiments of FIGS. 2 to 5 and may be provided with the angled horizontal stabilizer of FIGS. 1 and 6 to 8, extending downward from front to rear, in order to counteract the nose-up tendency by producing lift proximate the rear end of the tail opposite the fuselage. Again, the stabilizer may be oversized relative to that of a comparably sized conventional helicopter to increase stability during forward cruising. It should be appreciated that while illustrated as being disposed rearward of the tail rotor, the angled stabilizer need not be so located, but that increasing the distance of the stabilizer rearward from the pitch axis of the aircraft increases its effect. For example, an aircraft of the present invention may be provided with a shrouded tail rotor enclosed by a shroud formed integrally with the tail, as known to those of skill in the art, in which case the stabilizer may be provided just forward of the tail rotor.

For the forgoing embodiments, adding small lift-generating components that provide an insignificant fraction of the overall lift relative to that provided by the rotor in forward flight would not change the fact that the rotor is being relied upon to provide substantially wholly the aircraft's lift. So while the forgoing embodiments provide increased speed over conventional helicopters without the need for the wings of a compound helicopter, the addition of wings small enough span to avoid a high degree of interference with the rotor's downwash should not take the aircraft outside the scope of the claims.

Figure 7:
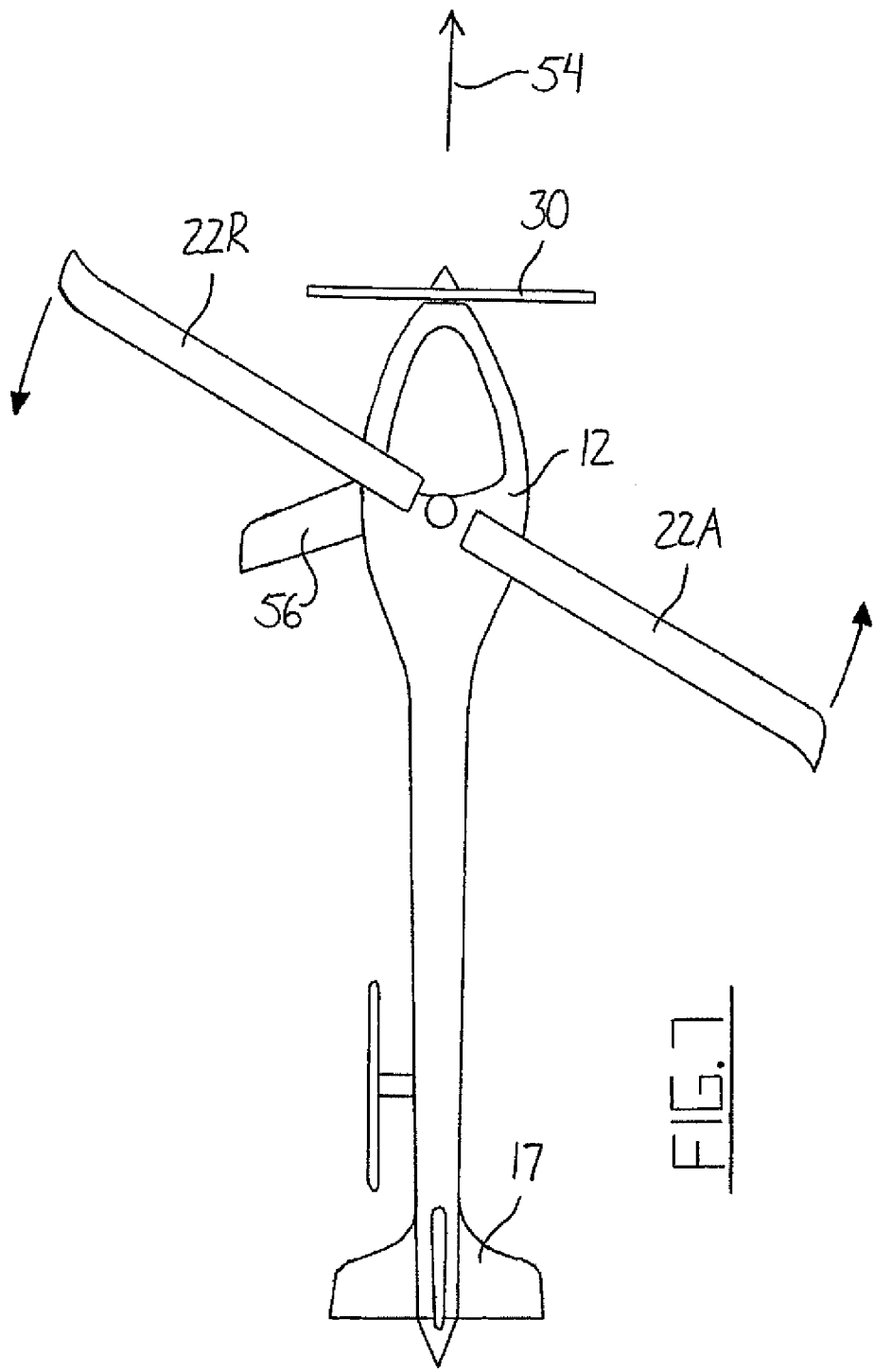
FIG. 7 is a side elevational view of an aircraft according to a fourth embodiment of the present invention.
Figure 8:
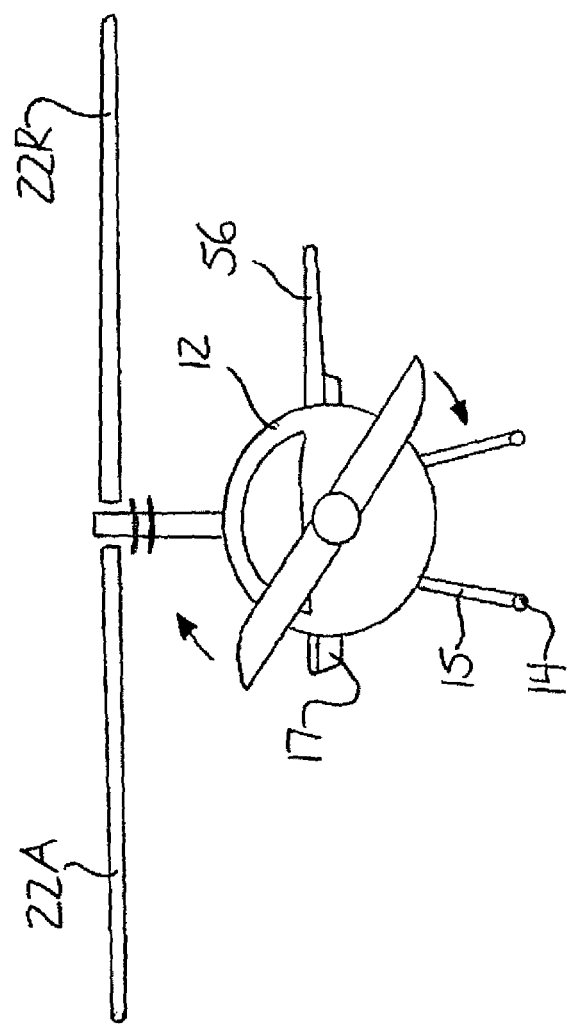
FIG. 8 is a front elevational view of the aircraft of FIG. 7.

FIGS. 7 and 8 show a fourth embodiment that has been developed to further reduce the angle of attack of the main rotor blades during forward flight. As described in the background section hereof and well known to those of skill in the art, dissymmetry of lift in forward flight is caused by a difference in the lift created by the advancing and retreating blades. Looking at FIG. 7, blades 22R and 22A are in the retreating and advancing portions of the rotor's rotation respectively if the aircraft is considered to be moving in a forward direction as indicated by arrow 54 (the retreating and advancing portions being halves of the rotation in which the blade moves away from and toward the direction of the aircraft's motion respectively). With the lift on the advancing side exceeding that on the retreating side, the aircraft would tend to pitch nose up and roll toward the retreating side without some kind of compensation, typically provided by blade flapping and cyclic feathering. In this embodiment, the aircraft of the first embodiment has been provided with the addition of a small wing 56 on the retreating side of the fuselage 12. The wing extends laterally from the fuselage to provide lift that supplements that of the retreating blade to help correct the unbalanced lift and counteract the rolling tendency. Any lift provided by the wing rearward of the aircraft's pitch axis also assists in counteracting the nose-up tendency. The wing is kept relatively small to keep interference with the rotor's downwash low. For example, in the illustrated embodiment, a distance which the wing 56 extends from the fuselage is less than half of a distance which the rotor blades extend from the fuselage. This ensures that interference with the main rotor's lift is kept relatively low, because, as is known by those of skill in the art, more lift is provided by portions of the blades' proximate their distal ends. Using the wing with a blade flapping rotor, where advancing blades are allowed to flap up in response to increased lift to decrease their angle of attack and retreating blades are allowed to flap down in response to decreased lift to increase their angle of attack, the degree to which the retreating blades need to flap downward during forward flight is reduced due to the increase in lift on the retreating side by the wing. As a result, the downward flapping can be mechanically restricted to limit the maximum increase in angle of attack provided by blade flapping. The promotion of symmetric lift by the wing can also allow a reduction in the degree of cyclic feathering used in forward flight. Overall, the wing helps keep down the angle of attack of the main rotor to allow increased speed in forward flight without encountering retreating blade stall.

While the aircraft of the fourth embodiment does feature a wing supported on the fuselage, it is still distinct from a compound helicopter. While in the first three embodiments substantially all the vertical lift for maintaining altitude during forward flight is provided by the rotor, here the rotor's lift on the retreating side is supplemented by the wing. This embodiment still avoids the addition of large wings on each side of the fuselage as found in compound helicopters where lift from the pair of wings is necessary to maintain altitude when loading of the rotor is significantly decreased. In this embodiment the rotor still provides all the vertical lift on the advancing side needed for forward flight, but uses the small wing to produce some lift on the retreating side to lessen the degree of increase in angle of attack of the retreating blade to help avoid inducement of retreating blade stall. It should be appreciated that the illustrated wing, not extending a substantial length of the rotor blades, would produce significantly less vertical drag during vertical manoeuvres than the full size wings disposed on both sides of a compound helicopter. Although the fourth embodiment is shown as a modification of the first embodiment, it should be appreciated that the addition of the single wing could present the same benefits if applied to other embodiments of the present invention.

FIGS. 10 through 13 show a fifth embodiment aircraft that, like the fourth embodiment, features a single primary wing 56' that projects laterally from the fuselage on the retreating-blade side thereof at a position at or near those of the aircraft's center of gravity and the main rotor rotational axis along the aircraft's longitudinal axis, and a secondary tail wing or horizontal stabilizer 17' that projects laterally from the tail boom 18 at the distal end thereof and is configured to provide lift at this tail end of the aircraft. The key differences between the fourth and fifth embodiments are that, in the fifth embodiment, the tail wing 17' projects only to one side of the tail boom 18, and the vertical stabilizer 19' is carried on this single-sided tail wing 17' at a distance laterally outward from the tail boom 18.

The fifth embodiment aircraft is piloted in the same manner the fourth embodiment. The main rotor, as viewed from above, rotates in the same one of a clockwise or counterclockwise direction as the propeller 30, as viewed from behind, and the rotational plane of the propeller is perpendicular to the longitudinal axis of the aircraft, and thus generally perpendicular to the rotational plane of the main rotor. The main helicopter rotor is driven at all times during flight to provide lift regardless of the aircraft's attained velocity, even at high speed forward cruising where forward thrust is provided by the propeller 30 instead of the main rotor, unlike prior art compound helicopters where the rotor is unloaded at higher speeds to rely on a large wing span on both sides of the fuselage for sufficient lift. The single primary wing 56' on the retreating blade side of the fuselage creates a degree of wing-provided lift that is unmatched on the opposite advancing-blade side of the fuselage, and this wing-provided lift counteracts the imbalance or dissymmetry of rotor-provided lift across these opposing sides of the aircraft. As would be experienced in the fourth embodiment, as the aircraft increases its speed during forward cruising, the drag on the primary wing 56' increases. This wing-drag acts in a direction tending to cause yaw of the aircraft in the direction opposite to that of the rotor reaction torque.

As the cruising speed of the fourth embodiment aircraft increases, less reliance on the tail rotor 26 is thus required, as the introduction of this primary wing-drag counters the rotor reaction torque. At high enough speed, as this wing-drag on the retreating-blade side of the fuselage passes a value sufficient to completely balance out the main rotor reaction torque (at which point the tail rotor can pitch can be reduced to a minimum) and increases to a point where it overcomes the main rotor reaction torque, this drag-effect acts to reverse the direction in which the aircraft tends to yaw. The fourth embodiment has no feature for preventing such yaw-reversal from occurring at such speed, or for countering this reversed-direction yaw if induced, and so the aircraft can only be safely flown at speeds below that where the primary wing drag overtakes the main rotor reaction torque at minimum tail rotor pitch. The fifth embodiment in FIGS. 10 to 13 however uses the one-sided asymmetric tail wing 17' and offset vertical stabilizer 19' to provide an unbalanced drag across the tail end of the aircraft to counteract the degree of yaw induced by the drag of the primary wing 56'.

Figure 12:
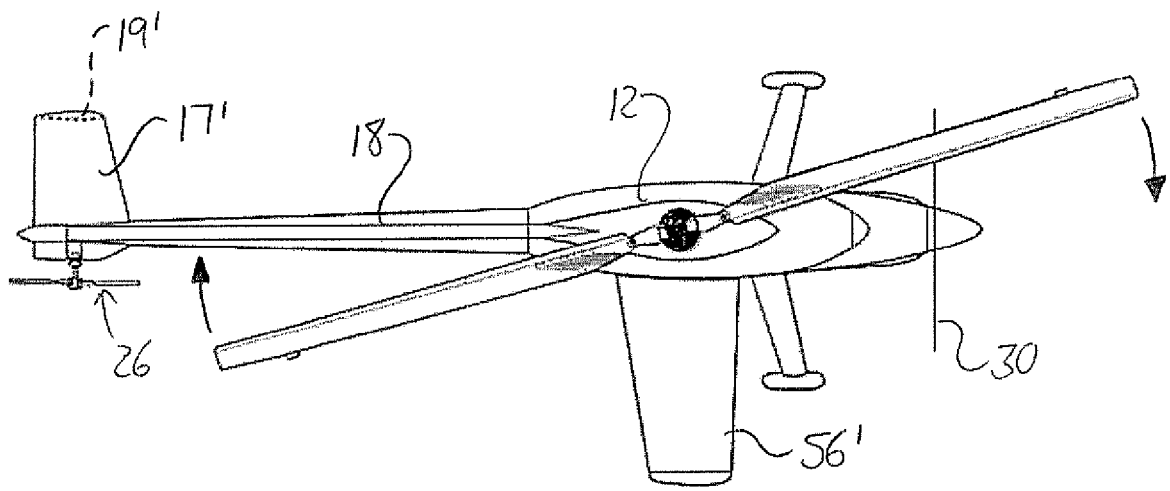
FIG. 12 is an overhead plan view of the aircraft of FIGS. 10 and 11.
Figure 13:
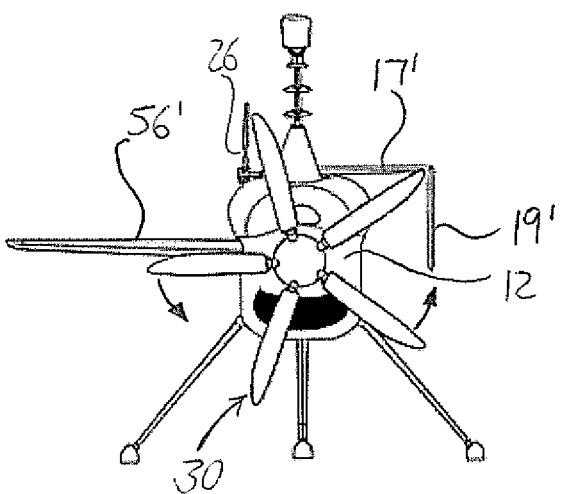
FIG. 13 is a front elevational view of the aircraft of FIGS. 10 through 12.

That is, referring to FIG. 12, the drag of the primary wing 56' acts on the retreating-blade side of the fuselage, while the drag of the tail wing 17' and vertical stabilizer act on the advancing-blade side of the tail boom 18. These drag forces at the fuselage and tail thus create opposing moments about the main helicopter rotor axis at the lateral center of the aircraft, and so the yaw effects of the asymmetric tail wing 17' and offset vertical stabilizer 19' counter the yaw effect of the primary wing 56' projecting asymmetrically to one side of the fuselage. Meanwhile, the tail wing 17' also acts to provide lift of the tail of the aircraft, as in the first and fourth embodiments, in order to counteract a nose-up tendency of the aircraft when the propeller is operated to provide forward thrust. Although the vertical stabilizer 19' laterally offset from the tail boom 18 is shown as depending downward from the tail wing 17', it may alternatively project upward therefrom, or extend in a combination of both directions upward and downward from the tail wing 17'.

The fifth and sixth embodiments also differ from the other illustrated embodiments in the replacement of a four-legged or four-brace skid-type landing gear at the fuselage with a two-legged or two-brace landing structure 15a at the fuselage and a single-leg or single brace 15b at the tail end of the aircraft. With each leg or brace depending downward from the fuselage or tail boom, this tri-pod configuration provides three points of ground contact when the aircraft is landed in order to fully and stably support the fuselage and tail boom. This illustrates alternate how various landing gear configurations can be used within the scope of the present invention without detriment to the flight operation and functionality thereof.

It will be appreciated that that asymmetric wing configurations other than the purely one-sided primary and tail wings disclosed herein above may be employed while providing similar advantage over prior art helicopters or compound helicopters, so long as they each provide asymmetric wing-generated lift that is greater on one side of the aircraft than the other. For example, one embodiment may feature modification the secondary or tail wing 17' of the fifth embodiment to extend from both sides of the tail, but farther to the advancing blade side thereof than to the retreating blade side so as to provide more tail lift on the advancing-blade side than the retreating blade side, and repositioning of the tail wing 17' slightly ahead of or behind the tail rotor so as not to interfere therewith. Similarly, a short stubby wing of less lifting-capability than the illustrated one-sided primary wing 56' could be mounted on the opposing side of the fuselage without losing the described asymmetry of wing-generated lift across the fuselage to counter the main rotor's dissymmetry of lift. In other words, the primary wing configuration on the fuselage could project to both sides thereof, so long as it is still configured to provide more lift on the retreating-blade side, for example by extending further to that side then that other.

Also, the use of an asymmetric primary wing configuration providing more lift on the retreating-blade side of a rotor-based aircraft than on the advancing-blade side thereof may be used in the same manner to counteract the main rotor's dissymmetry of lift even of the aircraft uses a source of forward thrust other than the illustrated nose-mounted tractor propeller configuration. For example, the asymmetric primary wing configuration may be used with a pusher propeller configuration in which one or more rearward facing propellers provide forward thrust. Likewise, the asymmetric tail or horizontal stabilizer may be used counter the yaw inducing drag of the primary wing regardless of the source of the thrust, which may or may not require the asymmetric tail assembly to lift the tail depending on whether alternate thrust configurations cause the same nose-up tendency of the aircraft in forward cruising.

Figure 14:
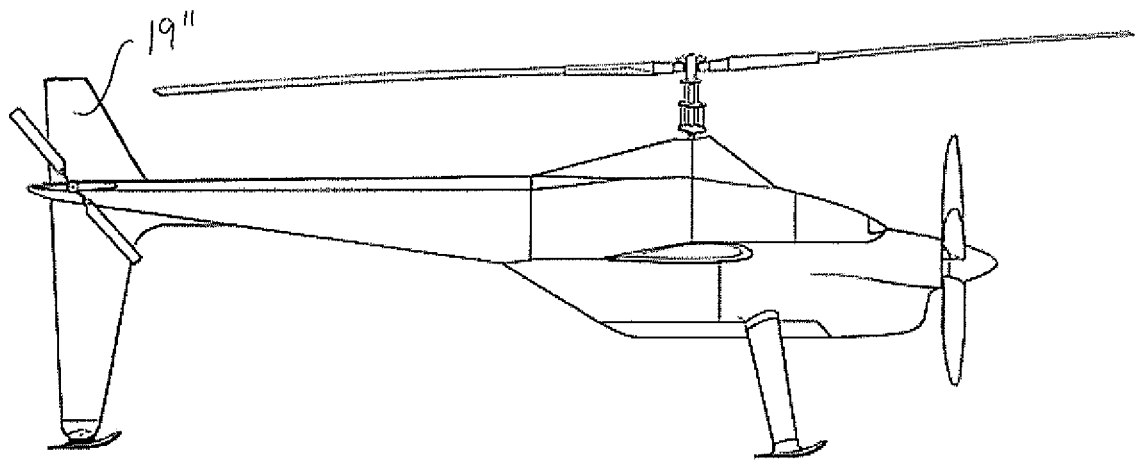
FIG. 14 is a right side elevational view of an aircraft according to a sixth embodiment of the present invention.
Figure 15:
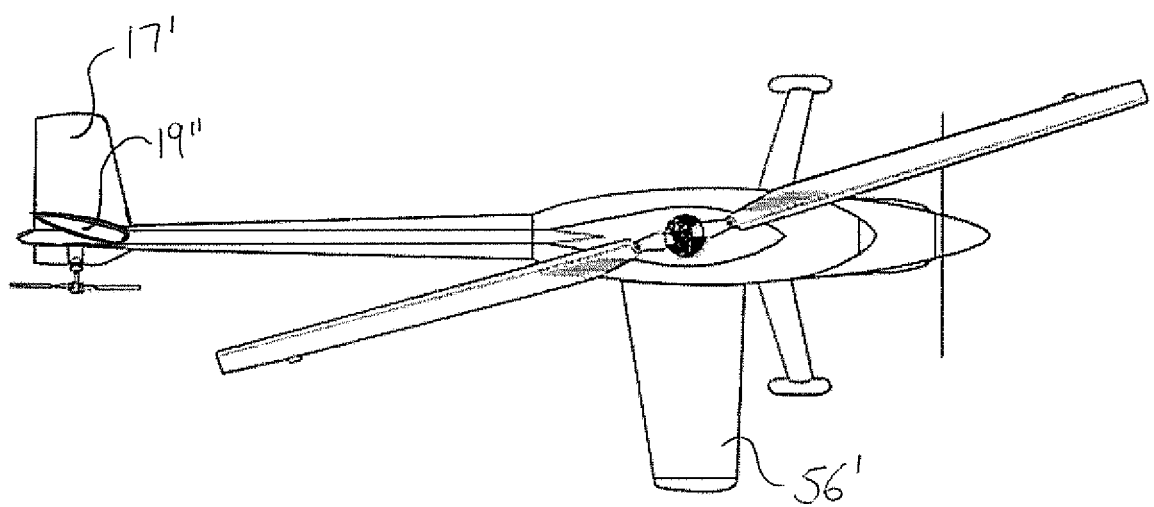
FIG. 15 is an overhead plan view of the aircraft of FIG. 14.

FIGS. 14 and 15 show a sixth embodiment which shares the same main rotor, propeller, asymmetric primary or main wing 56', and asymmetric secondary or tail wing 17' of the fifth embodiment, but differs in that the offset vertical stabilizer 19' positioned at the distal end of the tail wing 17' is replaced by a more central vertical stabilizer 19" that is instead positioned immediately at the tail boom 18, rather than laterally outward therefrom. Aside from this different position, the vertical stabilizer 19" is also oriented differently than that of the fifth embodiment so as to be obliquely angled relative to the longitudinal axis of the aircraft in a direction sloping toward the advancing-blade side of the aircraft when moving from the leading edge of the stabilizer 19" to the trailing edge thereof. During forward flight, this angled arrangement creates a lateral force transverse to the longitudinal axis in a direction which opposes the yaw induced by the drag of the asymmetric primary wing 56'. This thrust from the vertical stabilizer 19" during forward flight thus opposes any thrust from the tail rotor 26, and generates a yaw tendency that acts in the same direction as the main rotor reaction torque. This contradicts conventional helicopter design, where if the vertical stabilizer is intended to thrust the tail laterally, it is in a direction supplementing the tail rotor and opposing the main rotor reaction torque.

An unillustrated embodiment may include an asymmetric tail wing or horizontal stabilizer as the only tail element countering the yaw effect of the primary wing drag, and for example employ a centrally positioned vertical stabilizer aligned with the longitudinal axis of the aircraft. Another unillustrated embodiment may instead employ an angled vertical stabilizer like that of FIG. 14 as the only tail element countering the yaw effect of the primary wing drag, and for example employ a symmetric tail wing or horizontal stabilizer.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. is amended as follows:
An aircraft comprising:
a fuselage having a front end and a longitudinal axis;
a main helicopter rotor supported for rotation about an axis thereof on top of the fuselage, said rotor being operable to control both vertical and horizontal movement of the aircraft;
a powerplant supported on the fuselage and operatively connected to the main helicopter rotor for driven rotation thereof in a direction causing blades of the main helicopter rotor to retreat rearwardly away from the front end of the fuselage on a first side of the fuselage;
a thrust generator supported on the fuselage and operable to selectively product thrust to move the aircraft forward;
a primary wing configuration supported on the fuselage and projecting laterally outward relative thereto to counter dissymmetry of lift of the main helicopter rotor during forward flight by producing more wing-generated lift on the first side of the fuselage than on a second side thereopposite, and
a tail assembly that comprises a tail boom extending rearward from the fuselage and a tail structure extending laterally from the tail boom at a distance rearward from the fuselage, the tail structure being configured to produce more drag on one side of the tail boom than another, the one side of the tail boom on which more drag is provided by the tail structure being opposite the first side of the fuselage.

2. The aircraft of claim 1 wherein the primary wing configuration projects laterally outward relative to the fuselage on only the first side thereof.

3. The aircraft of claim 1 comprising a vertical stabilizer supported on the tail structure at a distance laterally outward from the tail boom on the side thereof on which more drag is generated by the tail structure.

4. The aircraft of claim 1 comprising a vertical stabilizer supported on the tail boom in an orientation angled out of alignment with the longitudinal axis to, during forward flight, exert a transverse force on the tail from a side thereof opposite the first side of the fuselage.

5. The aircraft of claim 1 wherein the thrust generator comprises a propeller arranged for driven rotation about a propeller axis at the front end of the fuselage, the main helicopter rotor and the propeller being arranged to rotate in a same one of clockwise or counterclockwise directions as viewed from above and behind respectively.

6. is amended as follows:
An aircraft comprising:
a fuselage having a front end and a longitudinal axis;
a main helicopter rotor supported for rotation about an axis thereof on top of the fuselage, said rotor being operable to control both vertical and horizontal movement of the aircraft;
a powerplant supported on the fuselage and operatively connected to the main helicopter rotor for driven rotation thereof in a direction causing blades of the main helicopter rotor to retreat rearwardly away from the front end of the fuselage on a first side of the fuselage;
a thrust generator supported on the fuselage and operable to selectively product thrust to move the aircraft forward;
a primary wing configuration supported on the fuselage and projecting laterally outward relative thereto to counter dissymmetry of lift of the main helicopter rotor during forward flight by producing more wing-generated lift on the first side of the fuselage than on a second side thereopposite, and
a secondary wing configuration supported on the fuselage at a position rearward from the primary wing configuration and rearward from the axis of the main helicopter rotor to provide lift of a tail boom extending rearward from the fuselage during forward flight, the secondary wing configuration being arranged to provide more lift to one side of the tail boom than another, the one side of the tail boom on which more lift is provided by the secondary wing configuration being opposite the first side of the fuselage.

7. The aircraft of claim 6 wherein the secondary wing configuration projects further laterally to one side of the tail boom than another, the one side of the tail boom to which the secondary wing configuration projects further being opposite the first side of the fuselage.

8. The aircraft of claim 6 comprising a vertical stabilizer supported on the secondary wing at a distance laterally outward from the tail boom on the side thereof on which more lift is provided by the secondary wing configuration.

9. The aircraft of claim 6 wherein the primary wing configuration projects laterally outward relative to the fuselage on only the first side thereof.

10. The aircraft of claim 6 comprising a vertical stabilizer supported on the tail boom in an orientation angled out of alignment with the longitudinal axis to, during forward flight, exert a transverse force on the tail from a side thereof opposite the first side of the fuselage.

11. The aircraft of claim 6 wherein the thrust generator comprises a propeller arranged for driven rotation about a propeller axis at the front end of the fuselage, the main helicopter rotor and the propeller being arranged to rotate in a same one of clockwise or counterclockwise directions as viewed from above and behind respectively.

12. The aircraft of any one of claims 1, 2, 6, 7, 8-4 and 9-11 wherein the thrust generator comprises a propeller arranged for driven rotation about a propeller axis at the front end of the fuselage.

* * * * *